(12) United States Patent
Shiota et al.

(10) Patent No.: US 9,691,549 B2
(45) Date of Patent: Jun. 27, 2017

(54) LAMINATED CERAMIC CAPACITOR HAVING RARE-EARTH ELEMENT IN CRYSTAL GRAINS OF DIELECTRIC CERAMIC LAYERS

(71) Applicant: MURATA MANUFACTURING CO., LTD., Nagaokakyo-Shi, Kyoto-fu (JP)

(72) Inventors: Akihiro Shiota, Nagaokakyo (JP); Makoto Matsuda, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 385 days.

(21) Appl. No.: 14/178,659

(22) Filed: Feb. 12, 2014

(65) Prior Publication Data
US 2014/0160626 A1 Jun. 12, 2014

Related U.S. Application Data

(63) Continuation of application No. PCT/JP2012/073125, filed on Sep. 11, 2012.

(30) Foreign Application Priority Data

Sep. 12, 2011 (JP) ................................ 2011-198331

(51) Int. Cl.
*H01G 4/12* (2006.01)
*H01G 4/30* (2006.01)

(52) U.S. Cl.
CPC .............. *H01G 4/12* (2013.01); *H01G 4/1227* (2013.01); *H01G 4/30* (2013.01)

(58) Field of Classification Search
CPC ........... H01G 4/12; H01G 4/1227; H01G 4/30
See application file for complete search history.

(56) References Cited

U.S. PATENT DOCUMENTS

| | | | |
|---|---|---|---|
| 5,234,641 A | † | 8/1993 | Rutt |
| 2003/0039090 A1 | * | 2/2003 | Konaka .................. B32B 18/00 361/311 |

(Continued)

FOREIGN PATENT DOCUMENTS

| | | |
|---|---|---|
| JP | 1-202807 | 8/1989 |
| JP | 8-319157 | 3/1996 |

(Continued)

OTHER PUBLICATIONS

PCT/JP2012/073125 Written Opinion dated Jan. 8, 2013.
(Continued)

*Primary Examiner* — David M Sinclair
(74) *Attorney, Agent, or Firm* — Arent Fox LLP (57) ABSTRACT

A laminated ceramic capacitor that includes a laminated body that has dielectric ceramic layers including crystal grains and crystal grain boundaries and has internal electrode layers; and external electrodes on the surface of the laminated body and electrically connecting the internal electrode layers exposed at the surfaces of the laminated body. When a direct-current voltage is applied to the laminated ceramic capacitor, the voltage/current curve has a critical point dividing the curve into a first area on the lower-voltage side and a second area on the higher-voltage side, an electric field obtained by dividing the critical voltage at the critical point by the thickness of one of the dielectric ceramic layers when the voltage (V)/current (I) characteristics are measured at 25° C. is 10 V/μm or more, and the voltage/current curve has a slope of 3 or less in the second area.

18 Claims, 4 Drawing Sheets

(56) References Cited

U.S. PATENT DOCUMENTS

| | | | |
|---|---|---|---|
| 2010/0142120 A1* | 6/2010 | Azuma | C01G 23/006 361/321.5 |
| 2011/0128665 A1† | 6/2011 | Nies | |
| 2011/0194228 A1* | 8/2011 | Ishihara | C04B 35/4682 361/301.4 |
| 2011/0216471 A1* | 9/2011 | Fukuda | C04B 35/4682 361/321.4 |
| 2012/0147518 A1* | 6/2012 | Matsuda | H01G 4/1227 361/301.4 |

FOREIGN PATENT DOCUMENTS

| | | | | |
|---|---|---|---|---|
| JP | 09035985 A | * | 2/1997 | |
| JP | 10-335174 | | 12/1998 | |
| JP | 2007-173714 A | | 7/2007 | |
| JP | 2007223872 A | * | 9/2007 | |
| JP | 4022228 | | 12/2007 | |
| JP | 2010-232260 A | | 10/2010 | |
| JP | WO 2011024582 A1 | * | 3/2011 | H01G 4/1227 |

OTHER PUBLICATIONS

PCT/JP2012/073125 ISR dated Jan. 8, 2013.
Y. Yuan et al.; "High-Temperature Capacitor Materials Based on Modified $BaTiO_3$", Journal of Electronic Materials, vol. 38, No. 5, pp. 706-710, published online Feb. 28, 2009.†

* cited by examiner
† cited by third party

LAMINATED CERAMIC CAPACITOR HAVING RARE-EARTH ELEMENT IN CRYSTAL GRAINS OF DIELECTRIC CERAMIC LAYERS

CROSS REFERENCE TO RELATED APPLICATIONS

The present application is a continuation of International application No. PCT/JP2012/073125, filed Sep. 11, 2012, which claims priority to Japanese Patent Application No. 2011-198331, filed Sep. 12, 2011, the entire contents of each of which are incorporated herein by reference.

FIELD OF THE INVENTION

The present invention relates to a laminated ceramic capacitor with the use of a dielectric ceramic, and is suitable, in particular, for the reduction in layer thickness of a laminated ceramic capacitor.

BACKGROUND OF THE INVENTION

With the progress of recent electronics technology, the reduction in size and the increase in capacitance have been required for laminated ceramic capacitors. In order to satisfy these requirements, the thickness of dielectric ceramic layers of laminated ceramic capacitors are tend to be reduced. However, the reduction of the dielectric ceramic layers in layer thickness relatively increases the electric field intensity applied per layer. Therefore, improvement in reliability is required for the dielectric ceramic for use in the dielectric ceramic layers, regarding insulation properties when applied with a voltage, lifetime characteristics in a high-temperature loading test, etc.

For example, Patent Document 1 discloses a laminated ceramic capacitor characterized in that when 10 V and 50 V are respectively applied as voltages V1 and V2 at 125° C., and when the currents flowing when the voltages are applied are respectively denoted by I1 and I2, the coefficient α from α=Log(I2/I1)/Log(V2/V1) is 3.22 or less.

Patent Document 1: Japanese Patent No. 4022228

SUMMARY OF THE INVENTION

In Patent Document 1, when dielectric ceramic layers are 3.1 µm in thickness, a voltage of 20 V is applied in a high-temperature loading test. More specifically, under an electric field intensity of about 6.5 V/µm, a certain level of reliability is ensured.

However, in the case of Patent Document 1, when the ceramic layers are reduced in thickness down to 2 µm and to 1 µm, the electric field intensity exceeds 10 V/µm to change the electrical conduction mechanism and make the current to flow more easily. As a result, there is a problem that insulation defects (in particular, initial failures and chance failures) are more likely to be generated.

The present invention is, in view of this problem, intended to provide a highly reliable laminated ceramic capacitor which is less likely to cause insulation defects even when the electric field intensity is relatively increased with the reduction in layer thickness.

More specifically, the present invention relates to a laminated ceramic capacitor including: a laminated body that has dielectric ceramic layers including crystal grains and crystal grain boundaries and has internal electrode layers; and external electrodes formed on the surface of the laminated body for electrically connecting the internal electrode layers exposed at the surface of the laminated body.

Characteristically, from voltage (V)/current (I) characteristics obtained when a direct-current voltage is applied at 25° C. to the laminated ceramic capacitor, the voltage/current curve with Log V on the horizontal axis and Log I on the vertical axis has a critical point dividing the curve into a first area on the lower-voltage side and a second area on the higher-voltage side, the critical electric field is 10 V/µm or more, which is obtained by dividing the critical voltage at the critical point by the thickness of one of the dielectric ceramic layers, and the voltage/current curve has a slope of 3 or less in the second area.

In addition, characteristically, from voltage (V)/current (I) characteristics obtained when a direct-current voltage is applied at 85° C. to the laminated ceramic capacitor, the voltage/current curve with Log V on the horizontal axis and Log I on the vertical axis has a critical point dividing the curve into a first area on the lower-voltage side and a second area on the higher-voltage side, the critical electric field is 10 V/µm or more, which is obtained by dividing the critical voltage at the critical point by the thickness of one of the dielectric ceramic layers, and the value obtained by subtracting the slope of the voltage/current curve in the first area from the slope of the voltage/current curve in the second area is 1 or less.

In addition, the present invention relates to a laminated ceramic capacitor including: a laminated body that has dielectric ceramic layers and internal electrode layers, the dielectric ceramic layers including crystal grains and crystal grain boundaries and having a composition including a barium titanate compound and containing a rare-earth element; and external electrodes formed on the surface of the laminated body for electrically connecting the internal electrode layers exposed at the surface of the laminated body.

More specifically, C is 30 or more, preferably 60 or more when A is a value obtained by dividing a D10 value (µm) for a thickness of the dielectric ceramic layers by a D90 value (µm) for crystal grain size, B is a value obtained by integrating the molar ratio (%) of the rare-earth element to titanium in the crystal grain in the range of 0 to 24 nm in a direction from the grain boundary into the grain, and C=A×B is satisfied.

Even when the dielectric ceramic layers are reduced in thickness to relatively increase the electric field intensity in the case of applying a working voltage, a highly reliable laminated ceramic capacitor can be achieved which reduces concern about insulation defects. The invention is effective, in particular, for reducing the failure rate of chance failures and initial failures.

DETAILED DESCRIPTION OF THE INVENTION

Figure 1:
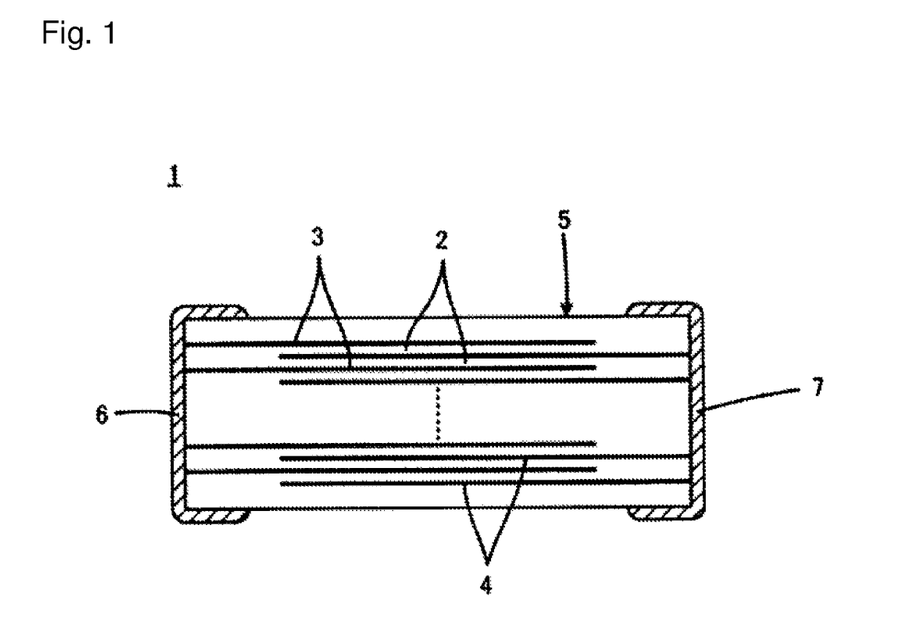
FIG. 1 is a cross-sectional view schematically illustrating a laminated ceramic capacitor 1 composed with the use of a dielectric ceramic according to the present invention.

With reference to FIG. 1, an example of a laminated ceramic capacitor 1 according to the present invention will be first described.

The laminated ceramic capacitor 1 includes a laminated body 5 composed with the use of a plurality of dielectric ceramic layers 2 stacked and a plurality of internal electrodes 3 and 4 formed along the interfaces between the dielectric ceramic layers 2. The internal electrodes 3 and 4 contain, for example, Ni, as their main constituent.

First and second external electrodes 6 and 7 are formed in different positions from each other on the outer surface of the laminated body 5. The external electrodes 6 and 7 contain, for example, Ag or Cu as their main constituent. Although not shown, a plating film is formed on the external electrodes 6 and 7, if necessary. The plating film is composed of, for example, a Ni plating film and a Sn plating film formed thereon.

In the case of the laminated ceramic capacitor 1 shown in FIG. 1, the first and second external electrodes 6 and 7 are formed on the respective end surfaces of the capacitor main body 5, which are opposed to each other. The internal electrodes 3 and 4 include a plurality of first internal electrodes 3 electrically connected to the first external electrode 6 and a plurality of second internal electrodes 4 electrically connected to the second external electrode 7, and these first and second internal electrodes 3 and 4 are arranged alternately in the stacking direction.

It is to be noted that the laminated ceramic capacitor 1 may be a two-terminal capacitor including two external electrodes 6 and 7, or may be a multi-terminal capacitor including a larger number of external electrodes.

Figure 2:
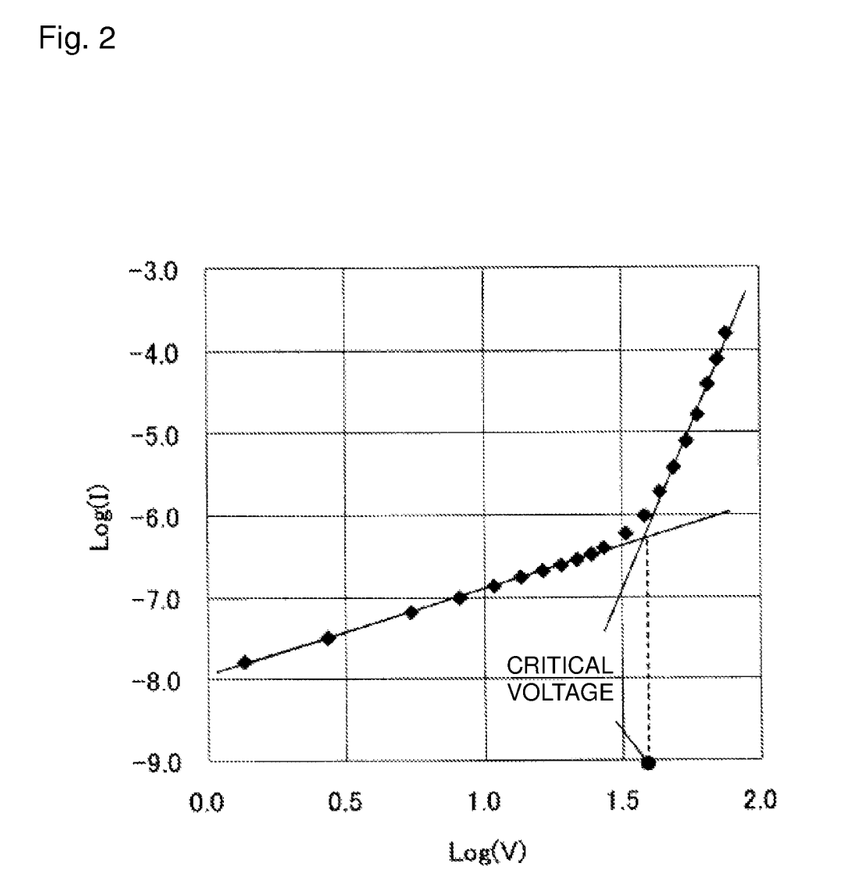
FIG. 2 is a diagram for explaining a critical voltage.

In the case of the laminated ceramic capacitor according to the present invention, from the voltage (V)/current (I) characteristics obtained when a direct-current voltage is applied to the laminated ceramic capacitor, the voltage/current curve with Log V on the horizontal axis and Log I on the vertical axis has a critical point that divides the curve into a first area on the lower-voltage side and a second area following the first area on the higher-voltage side, as shown in FIG. 2. The curve in the first area is considered to obey Ohm's law, whereas the curve in the second area is considered to obey a Poole-Frenkel conduction mechanism. In this case, to be exact, the range for each of the first area and second area refers to an area in which the correlation coefficient is 0.95 or more when three or more plots are subjected to straight-line approximation. In addition, the critical voltage refers to the voltage at the intersection of an approximated straight line in the first area with an approximated straight line in the second area. The critical electric field is obtained by dividing the critical voltage by the average thickness of one of the dielectric ceramic layers.

In the case of the laminated ceramic capacitor according to the present invention, when the voltage (V)/current (I) characteristics are measured at 25° C., the critical electric field obtained by dividing the critical voltage by the thickness of one of the dielectric ceramic layers is 10 V/μm or more, and the voltage/current curve has a slope of 3 or less in the second area. In addition, when the voltage (V)/current (I) characteristics are measured at 85° C., the critical electric field obtained by dividing the critical voltage by the thickness of one of the dielectric ceramic layers is 10 V/μm or more, and the value obtained by subtracting the slope of the voltage/current curve in the first area from the slope of the voltage/current curve in the second area is 1 or less.

In the graph of the voltage (V)/current (I) characteristics, as V is increased, the electrical conduction mechanism is considered to be changed from Ohm's law to an area not obeying Ohm's law to make the current to flow more easily. If the products being non-defective when used in the area obeying Ohm's law are used in the area not obeying Ohm's law, such products are likely to cause insulation defectives in the form of an initial failure defect or a chance failure defect in the area not obeying Ohm's law.

Further, the following will be given as a specific example of the laminated ceramic capacitor which meets the voltage (V)/current (I) characteristics as described above.

The composition of the dielectric ceramic layers contains, as its main constituent, a barium titanate compound. This barium titanate compound includes not only pure barium titanate, but also barium titanate with some of barium or titanium substituted with calcium, strontium, zirconium, or the like. The composition contains, as an accessory constituent, a rare-earth element typified by Dy, Y, Ho, Gd, and the like. Obviously, the composition may contain elements such as Mg, Mn, Si, V, Al, and Cr, if necessary.

Next, the value obtained by dividing the D10 value (μm) for the thickness of dielectric ceramic layers by the D90 value (μm) for crystal grain sizes is denoted by A. It is enough to measure the thickness of the dielectric ceramic layers at approximately 200 points, and obtain the D10 value for the distribution. As for the D90 value for crystal grain size, it is enough to observe 500 crystal grains, desirably 1000 crystal grains at a fractured surface, obtain the equivalent circle diameter by image analysis, and obtain the D90 value for the distribution. This value of A substantially represents the smallest number among the numbers of crystal grains sandwiched between adjacent internal electrodes.

Then, the value obtained by integrating the molar ratio of the rare-earth element to titanium in the crystal grains in the range of 0 to 24 nm in a direction from the vicinity of the grain boundary into the grain is denoted by B. Specifically, the crystal grain is observed under a TEM, and quantitative analysis of the composition in the crystal grain is carried out by EDX. In the crystal grain, the composition analysis is carried out at 5 points of 0, 4, 8, 12, and 24 nm from the vicinity of the grain boundary toward the center of the grain. The rare-earth element/Ti molar ratio (%) is calculated at each point, and plotted on the vertical axis with the distance from the grain boundary (unit: nm) on the horizontal axis. The plotted dots are connected respectively with straight lines, and the area (unit: nm) of the section surrounded by the straight lines, the horizontal axis, and the vertical axis is obtained, and is often regarded as B. This area means the substantially total amount of the rare-earth element present in the surface layer portion of each crystal grain. It is enough to carry out the analysis for about 30 crystal grains in total.

Further, as for C=A×B, C means the total amount of the minimum rare-earth element present in the stacking direction of the dielectric ceramic layers. If C is 30 or more, insulation defectives are reduced, even when a relatively high working electric field is applied in the laminated ceramic capacitor reduced in layer thickness. If C is 60 or more, a further effect can be achieved.

Next, an example of a method for manufacturing the laminated ceramic capacitor will be described below.

First, a main constituent powder is prepared which has at least a barium titanate compound. For example, there is a method in which a Ba compound and a Ti compound are mixed, and subjected to a synthesis to obtain a barium titanate powder. Detailed examples include a solid-phase method, that is, a method in which a BaCO$_3$ powder and a TiO$_2$ powder are mixed and subjected to a heat treatment. Other preferred methods also include: a method in which a solution containing Ba is added to TiO$_2$ microparticles to synthesize a barium titanate in the solution; and wet synthesis methods such as a hydrothermal synthesis, a hydrolysis method, and an oxalic acid method. When some of the barium titanate is substituted with calcium, strontium, or zirconium, a Ca compound, a Sr compound, or a Zr compound may be added before the synthesis of the barium titanate.

The fired crystal grain size and the total amount of the rare-earth element in the crystal grains can be controlled by controlling the grain size and degree of crystallinity for the main constituent powder.

Next, compounds are prepared for rare-earth elements which serve as an accessory constituent. The forms of these compounds are not to be considered particularly limited, which may be oxide powders or carbonate powders, or may be sol or organometallic.

Then, an accessory constituent containing the rare-earth element compounds is mixed into the main constituent powder. In this case, other elements may be incorporated as accessory constituents. In addition, the mixed form of the accessory constituents is not to be considered particularly limited. For example, multiple types of accessory constituents may be mixed in advance, or further subjected to a heat treatment for synthesis. In addition, a specific accessory constituent may be added in two or more stages. Furthermore, the accessory constituents may be partially mixed in advance during the synthesis of the main constituent, without interfering with the object of the present invention.

The ceramic slurry obtained when the accessory constituents are mixed in the main constituent powder may be subjected to sheet forming by mixing a binder, etc. into the slurry. Alternatively, the main constituent powder mixed with the accessory constituents may be then dried to obtain a ceramic powder, which may be thereafter mixed again with a solvent to obtain ceramic slurry. If necessary, the ceramic powder may be subjected to a heat treatment to react the main constituent powder with the accessory constituents.

The particle size distribution of the main constituent powder can be controlled by filtering the ceramic slurry under various conditions. In this way, the fired crystal grain size and the total amount of the rare-earth element in the crystal grains can be controlled.

Next, this ceramic slurry is subjected to sheet forming to obtain ceramic green sheets. The ceramic green sheets and internal electrode layers are stacked to obtain an unfired laminated body. Specifically, there is a method in which a conductive paste including metal particles to serve as an internal electrode constituent and an organic vehicle is formed by application onto the surfaces of the ceramic green sheets, and these ceramic green sheets are stacked so as to alternate the directions in which the internal electrodes are drawn, and subjected to pressure bonding.

The raw laminated body obtained, from which the binder is removed, is then subjected to firing under an atmosphere with such an oxygen partial pressure that does not oxidize the internal electrodes and not reduce the dielectric ceramic. This firing provides the laminated body 5 including: the dielectric ceramic 2 including crystal grains and crystal grain boundaries; and the internal electrodes 3, 4.

The laminated ceramic capacitor 1 is obtained by forming external electrodes on sections of the laminated body 5 at which the internal electrode layers are exposed. It is to be noted that the formation of the external electrodes also includes a method in which a conductive paste is formed in advance by application onto the surface of the unfired laminated body, and baked at the same time as firing for the laminated body.

EXAMPLES

Experimental examples will be described below which were carried out according to the present invention.

Example 1

(Preparation of Ceramic Powder)

First, as starting raw materials for $BaTiO_3$ serving as a main constituent, high-purity $BaCO_3$ and $TiO_2$ were prepared, and blended.

Next, this blended powder was subjected to wet mixing in a ball mill to be dispersed uniformly, and then subjected to a drying treatment to obtain an adjusted powder. Then, the adjusted powder obtained was subjected to calcination at a temperature of 1000° C. to 1200° C. while being varied for each lot to obtain three types of main constituent powders with an average grain size of 0.07 to 0.15 µm.

On the other hand, respective powders of $MgCO_3$, $Dy_2O_3$, MnO, and $SiO_2$ were prepared as accessory constituents. The respective powders were weighed so that the contents of Mg, Dy, Mn, and Si with respect to 100 parts by mol of Ti were respectively 1 part by mol, 1 part by mol, 0.5 parts by mol, and 2 parts by mol, and added to each of the three types of main constituent powders to obtain three types of mixed powders.

(Preparation of Laminated Ceramic Capacitor)

Next, the three types of mixed powders with an organic solvent and a dispersant added thereto were subjected to wet mixing in a ball mill to be homogeneously dispersed. Further, a polyvinyl butyral-based binder and a plasticizer were added and mixing was carried out, and ceramic slurries were obtained.

The three types of ceramic slurries were filtered to adjust the particle size distributions.

Then, the filtered three types of ceramic slurries were each shaped by a die coater so that the fired dielectric ceramics were 0.7 µm, 1.2 µm, and 2.0 µm in thickness, thereby providing nine types of ceramic green sheets in total.

Next, a conductive paste containing Ni was applied by screen printing onto the nine types of ceramic green sheets, thereby forming conductive paste films to serve as internal electrodes.

Next, the multiple ceramic green sheets with the conductive paste films formed were stacked so as to alternate the sides to which the conductive paste films were drawn, thereby providing a raw laminated body to serve as a capacitor main body.

Next, this laminated body was heated at a temperature of 300° C. in an $N_2$ atmosphere to burn the binder, and then with the temperature increased at a rate of 100° C./min, subjected to firing at 1200° C. for 1 minute in a reducing atmosphere composed of a $H_2$—$N_2$—$H_2O$ gas with an oxygen partial pressure $10^{-10}$ MPa to obtain a sintered laminated body.

Next, a Cu paste containing $B_2O_3$—$Li_2O$—$SiO_2$—$BaO$ glass frit was applied onto both end surfaces of the capacitor main body described above, and fired at a temperature of 800° C. in an $N_2$ atmosphere to form external electrodes electrically connected to the internal electrodes, thereby providing laminated ceramic capacitors according to each sample.

The external dimensions of the thus obtained laminated ceramic capacitor were 1.0 mm in length, 0.5 mm in width, and 0.5 mm in thickness, and the average value of the thickness of the dielectric ceramic layer interposed between the internal electrodes was 0.7 µm in the case of samples 101 to 104 (substantially three types because samples 101 and 102 are exactly the same), 1.2 μm in the case of samples 201 to 203, and 2.0 μm in the case of samples 301 to 303. In addition, the number of effective dielectric ceramic layers was 100, and the area of the electrode opposed per dielectric ceramic layer was 0.3 mm².

(Characteristic Evaluation)

Next, the laminated ceramic capacitors according to each sample were evaluated as follows.

(1) Measurement of A

In Regard To Thickness of Dielectric Ceramic Layer

1) Preparation of Sample

The laminated ceramic capacitors prepared in the way described above were prepared to provide five capacitors for each sample.

2) Observation of LT Cross Section i) Polishing

Each sample was held in such an attitude that makes the width (W) direction perpendicular to a surface to be polished, and encased in resin, and the LT surface defined by the length (L) and thickness (T) of the sample was exposed from the resin.

Then, the LT surface of each sample was polished by a polishing machine, and polished down to the depth on order of ½ in the width (W) direction of each sample. Then, in order to eliminate shear drop from internal electrode by the polishing, the polished surface was processed by ion milling after the polishing.

ii) Measurement of Dielectric Ceramic Layer Thickness

Figure 3:
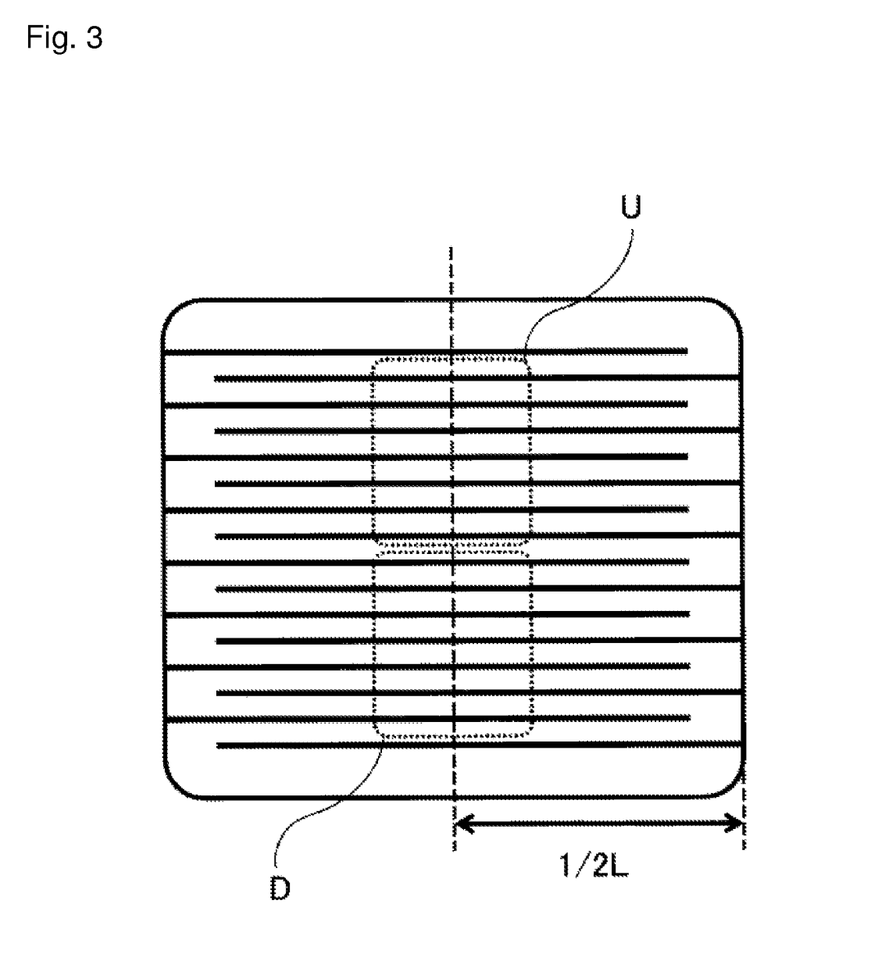
FIG. 3 is a diagram illustrating regions for measuring the thicknesses of dielectric ceramic layers.

Then, as shown in FIG. 3, a perpendicular line (orthogonal line) orthogonal to the internal electrodes was drawn in a position on the order of ½ in the L direction on the LT cross section. Next, a region of the sample with the internal electrodes stacked was divided equally in the thickness (T) direction into two regions of: upper section U and lower section D. Then, except for the outermost dielectric ceramic layer and two or more dielectric ceramic layers observed to be joined due to defective internal electrodes, the thickness of dielectric ceramic layers on the orthogonal line was randomly measured for 20 layers in each section to obtain the average value (Number of Pieces of Data: 20 layers×2 regions×5 (number of samples)=200 pieces of data). In addition, the D10 value for the thickness of the dielectric ceramic layers was obtained from the distribution of the 200 pieces of data.

It is to be noted that the thickness of the dielectric ceramic layers was measured with the use of a scanning electron microscope.

The laminated ceramic capacitors prepared in the way described above were prepared to provide five capacitors for each sample.

In Regard To Crystal Grain Size

3) Preparation of Sample for Observation

The sample was fractured so that the WT cross section was exposed in a position on the order of ½ in the L direction (length direction) of the sample.

The sample was subjected to a heat treatment in order to make the boundaries (grain boundaries) clear between the crystal grains in the ceramic. The temperature for the heat treatment was a temperature at which no grain growth is caused, and a temperature at which the grain boundaries are made clear. In the present example, the treatment was carried out at 1000° C.

4) Measurement of Crystal Grain Size

Figure 4:
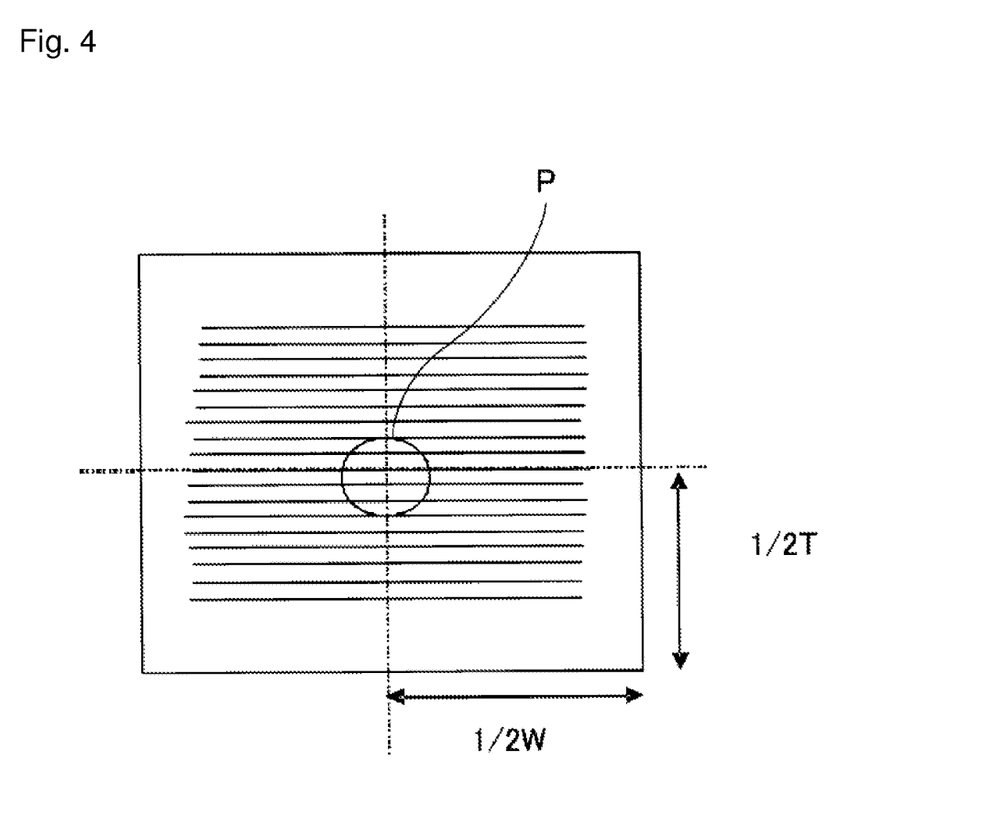
FIG. 4 is a diagram illustrating a point for observing crystal grain sizes.

As shown in FIG. 4, the crystal grain sizes of the ceramic layers were observed by FE-SEM in a position P on the order of ½ in each of the W direction (width direction) and T direction (height direction) of the WT fractured surface. In the present example, the observation was made at 30000-fold magnification.

From the obtained SEM image, 200 grains were randomly extracted, and the area inside each grain boundary was obtained by image analysis to calculate the equivalent circle diameter, and the diameter was regarded as the crystal grain size.

Number of Pieces of Data: 5 (number of samples)×200 grains=1000 pieces of data. In addition, the D90 value for crystal grain size was obtained from the distribution for the 1000 pieces of data.

For each sample of the nine types, the D10 value for the thickness of the dielectric ceramic layers was divided by the D90 value for crystal grain size, and this value was regarded as A. The values are shown in Table 1.

(2) Measurement of B

The laminated ceramic capacitors prepared in the way described above were prepared to provide three capacitors for each sample.

The laminated ceramic capacitors were reduced in layer thickness by an ion milling method.

Next, the exposed cross sections were observed by TEM to search crystal grain boundaries substantially perpendicular to the cross sections. Specifically, lines appearing on each side of crystal grain boundaries, that is, Fresnel fringes were observed by TEM (JEOL Ltd.: JEM-2200 FS) to search crystal grain boundaries with the Fresnel fringes nearly symmetrically changed on each side thereof in contrast, that is, crystal grain boundaries with the Fresnel fringes nearly symmetrically changed on each side thereof into bright lines or dark lines in the case of varying the focus, and the crystal grain boundaries were regarded as crystal grain boundaries substantially perpendicular to the cross section.

Then, crystal grain boundaries substantially perpendicular to the cross section were found at 10 points from different grains, and the positions of 0, 4, 8, 12, and 24 nm away from the respective crystal grain boundaries on the inside of the crystal grains were subjected to a composition analysis with the use of STEMEDX (probe diameter: 2 nm) to figured out Dy/Ti molar ratio (%). At the measurement point of 24 nm, the Dy/Ti was equal to or less than the detection limit for all of the crystal grains.

The Dy/Ti molar ratio (%) at each point was plotted on the vertical axis against the distance (unit: nm) from the grain boundary on the horizontal axis, the plotted dots were connected with approximated straight lines to find the area (unit: nm) of the portion surrounded by the approximated straight lines, the horizontal axis, and the vertical axis. The average of the areas was figured out for 30 (3 grains×10 points=30) crystal grains, and the value is shown as B in Table 1.

(3) Calculation of C

The product of A and B is regarded as C, and the value is shown in Table 1.

TABLE 1

| Sample Number | Thickness of Dielectric Ceramic Layer (μm) | A | B | C |
| --- | --- | --- | --- | --- |
| 101 | 0.7 | 2.0 | 6.7 | 13.2 |
| 102 | 0.7 | 2.0 | 6.7 | 13.2 |
| 103 | 0.7 | 2.1 | 18.1 | 38.3 |
| 104 | 0.7 | 2.8 | 24.1 | 67.5 |
| 201 | 1.2 | 2.5 | 6.7 | 16.8 |
| 202 | 1.2 | 2.7 | 18.1 | 48.8 |

TABLE 1-continued

| Sample Number | Thickness of Dielectric Ceramic Layer (μm) | A | B | C |
|---|---|---|---|---|
| 203 | 1.2 | 3.3 | 25.5 | 83.4 |
| 301 | 2.0 | 3.0 | 6.7 | 20.3 |
| 302 | 2.0 | 3.3 | 18.1 | 59.2 |
| 303 | 2.0 | 3.8 | 23.0 | 88.5 |

(4) Measurement of Dielectric Constant

For 30 samples for each sample number, the electrostatic capacitance of the laminated ceramic capacitor was measured under the conditions of 0.5 Vrms and 1 kHz at 25° C. with the use of an automatic bridge measurement machine. The dielectric constants were calculated from the obtained measurement values. The values are shown in Table 2.

(5) Measurement of Voltage (V)/Current (I) Characteristics

In the laminated ceramic capacitors for each sample, the direct-current voltage was varied in the range of 0.1 to 30 V at a temperature of 25° C. to obtain voltage/current curves with Log V on the horizontal axis and Log I on the vertical axis. It is to be noted that the unit of V is V (volt), whereas the unit of I is A (ampere). The value at 2 minutes after the voltage application for plotting was adopted for the current value. Further, the protective resistance was 10 kΩ. The range was found in which the correlation coefficient was 0.95 or more when the respective plots were subjected to straight-line approximation, and the range on the lower-voltage side was regarded as a first area, whereas the range on the higher-voltage side was regarded as a second area. The respective slopes are shown in Table 2.

In addition, the voltage at the intersection of an approximated straight lines in the respective areas was defined as a critical voltage, and this critical voltage was divided by the average thickness per dielectric ceramic layer to obtain a critical electric field. This critical electric field is also shown together in Table 2.

(6) High-Temperature Loading Test

The test voltage listed in Table 2 was applied at 85° C. to 100 samples of the laminated ceramic capacitors for each sample number to observe the temporal change in insulation resistance. The samples with the insulation resistance value down to 0.1 MΩ or less within 2000 hours after the test were regarded as defectives. The number of defectives is shown in Table 2 for each sample number.

First, samples 101 to 104 have an average thickness of 0.7 μm per dielectric ceramic layer. The sample 101 has a lower relative electric field intensity because of the test voltage of 4 V. Therefore, the sample 101 is treated as a reference sample. Therefore, no defect was found in the high-temperature loading test.

In the case of the sample 102 with the test voltage of 10 V, a large number of defects were generated as a result, because of the C value less than 30 and the excessively larger slope in the second area than 3.

In the case of the sample 103, the value of C is 30 or more, and the slope in the second area is 3 or less. However, some defects were generated because of the critical electric field below 10 V/μm.

In the case of the sample 104, the value of C is 60 or more, the slope in the second area is 3 or less, and the critical electric field is also 10 V/μm or more. No defect was generated.

Samples 201 to 203 have an average thickness of 1.2 μm per dielectric ceramic layer. As shown in Tables 1 and 2, there is a tendency for the number of defectives to be decreased as the value of C is larger, the slope in the second area is smaller, and the critical electric field is higher.

Samples 301 to 303 have an average thickness of 2.0 μm per dielectric ceramic layer. As shown in Tables 1 and 2, there is a tendency for the number of defectives to be decreased as the value of C is larger, the slope in the second area is smaller, and the critical electric field is higher.

Example 2

The same laminated ceramic capacitors as samples 101 to 104 in Example 1 were prepared, and regarded as samples 401 to 404. More specifically, the values of A, B, and C were obviously regarded as equal to those of the samples 101 to 104.

In the laminated ceramic capacitors for each sample, the direct-current voltage was varied in the range of 0.1 to 30 V at a temperature of 85° C. to obtain voltage/current curves with Log V on the horizontal axis and Log I on the vertical axis. The value at 2 minutes after the voltage application for plotting was adopted for the current value. Further, the protective resistance was 10 kΩ. The range was found in which the correlation coefficient was 0.95 or more when the respective plots were subjected to straight-line approximation, and the range on the lower-voltage side was regarded as a first area, whereas the range on the higher-voltage side was regarded as a second area. Table 3 shows the respective slopes, and the values obtained by subtracting the slope in the first area from the slope in the second area.

TABLE 2

| | | Voltage-Current Characteristics | | | High-Temperature Loading Test | | |
|---|---|---|---|---|---|---|---|
| Sample Number | Dielectric Constant | Slope in First Area | Slope in Second Area | Critical Electric Field (V/μm) | Test Voltage (V) | Electric Field Intensity (V/μm) | Number of Defectives (—) |
| 101 | 3100 | 1.0 | 5.8 | 7.6 | 4 | 5.7 | 0 |
| 102 | 3100 | 1.0 | 5.8 | 7.6 | 10 | 14.3 | 100 |
| 103 | 2600 | 1.0 | 2.8 | 8.9 | 10 | 14.3 | 8 |
| 104 | 2400 | 1.0 | 2.2 | 13.2 | 10 | 14.3 | 0 |
| 201 | 2900 | 1.0 | 4.5 | 7.0 | 16 | 13.3 | 50 |
| 202 | 2400 | 1.0 | 2.7 | 8.3 | 16 | 13.3 | 5 |
| 203 | 2200 | 1.0 | 2.1 | 11.8 | 16 | 13.3 | 0 |
| 301 | 2700 | 1.0 | 3.2 | 6.5 | 25 | 12.5 | 25 |
| 302 | 2200 | 1.0 | 2.6 | 7.8 | 25 | 12.5 | 2 |
| 303 | 2000 | 1.0 | 2.0 | 10.2 | 25 | 12.5 | 0 |

In addition, the voltage at the intersection of an approximated straight lines in the respective areas was defined as a critical voltage, and this critical voltage was divided by the average thickness (0.7 μm) per dielectric ceramic layer to obtain a critical electric field. This critical electric field is also shown together in Table 3.

Furthermore, the results of the high-temperature loading test for samples 101 to 104 in Example 1 are shown together in Table 3 as results for samples 401 to 404.

TABLE 3

| Sample Number | Voltage-Current Characteristics | | | | High-Temperature Loading Test | |
|---|---|---|---|---|---|---|
| | Slope in First Area | Slope in Second Area | Difference in Slope | Critical Electric Field (V/μm) | Test Voltage (V) | Electric Field Intensity (V/μm) | Number of Defectives (—) |
| 401 | 3.6 | 6.2 | 2.6 | 7.0 | 4 | 5.7 | 0 |
| 402 | 3.6 | 6.2 | 2.6 | 7.0 | 10 | 14.3 | 100 |
| 403 | 2.6 | 3.8 | 1.2 | 7.8 | 10 | 14.3 | 8 |
| 404 | 1.5 | 2.5 | 1.0 | 11.5 | 10 | 14.3 | 0 |

First, the sample 401 has a lower relative electric field intensity because of the test voltage of 4 V. Therefore, the sample 401 is treated as a reference sample. Therefore, no defect was found in the high-temperature loading test.

In the case of the sample 402 with the test voltage of 10 V, a large number of defects were generated as a result, because of the C value less than 30, the value obtained by subtracting the slope in the first area from the slope in the second area greater than 1, and also the critical electric field below 10 V/μm.

In the case of the sample 403, the value of C is 30 or more. However, some defects were generated as a result, because of the value obtained by subtracting the slope in the first area from the slope in the second area greater than 1, and also the critical electric field below 10 V/μm.

In the case of the sample 404, no defect was generated, because of the C value of 60 or more, the value obtained by subtracting the slope in the first area from the slope in the second area of 1 or less, and also the critical electric field of 10 V/μm or more.

DESCRIPTION OF REFERENCE SYMBOLS 1 laminated ceramic capacitor
2 dielectric ceramic layer
3, 4 internal electrode
5 laminated body
6, 7 external electrode

The invention claimed is:

1. A laminated ceramic capacitor comprising:
a laminated body comprising dielectric ceramic layers including a rare-earth element and crystal grains having a crystal grain boundary, and internal electrode layers, wherein an average thickness of each of the dielectric ceramic layers is 0.7 to 2.0 μm; and
external electrodes on respective surfaces of the laminated body and electrically connecting the internal electrode layers exposed at the respective surfaces of the laminated body,
wherein, C=A×B,
C is 30 or more,
A is a value obtained by dividing a D10 value representing a thickness of one of the dielectric ceramic layers by a D90 value representing a size of the crystal grains,
B is a value obtained by integrating a molar ratio (%) of the rare-earth element to titanium in the crystal grains in a range of 0 to 24 nm in a direction from the crystal grain boundary into the crystal grains, and
when a direct-current voltage is applied at 25° C. to the laminated ceramic capacitor, a voltage (V)/current (I) curve with Log V on a horizontal axis and Log I on a vertical axis has a critical point dividing the curve into a first area and a second area, the first area having a lower voltage than the second area,
a critical electric field obtained by dividing a critical voltage at the critical point by a thickness of one of the dielectric ceramic layers is 10 V/μm or more, and
the voltage (V)/current (I) curve has a slope of 3 or less in the second area.

2. The laminated ceramic capacitor according to claim 1, wherein the dielectric ceramic layers have a composition including a barium titanate compound.

3. The laminated ceramic capacitor according to claim 1, wherein C is 60 or more.

4. The laminated ceramic capacitor according to claim 1, wherein the D10 value is obtained by measuring the thickness of the one of the dielectric ceramic layers at approximately 200 points.

5. The laminated ceramic capacitor according to claim 4, wherein the D90 value is obtained by measuring 500 to 1000 of the crystal grains at a fractured surface.

6. The laminated ceramic capacitor according to claim 1, wherein the D90 value is obtained by measuring 500 to 1000 of the crystal grains at a fractured surface.

7. The laminated ceramic capacitor according to claim 1, wherein the molar ratio of the rare-earth element to the titanium in the crystal grain is carried out at 0, 4, 8, 12 and 24 nm in the direction from the grain boundary into the grain.

8. A laminated ceramic capacitor comprising:
a laminated body comprising dielectric ceramic layers including a rare-earth element and crystal grains having a crystal grain boundary, and internal electrode layers, wherein an average thickness of each of the dielectric ceramic layers is 0.7 to 2.0 μm; and
external electrodes on respective surfaces of the laminated body and electrically connecting the internal electrode layers exposed at the respective surfaces of the laminated body,
wherein, C=A×B,
C is 30 or more,
A is a value obtained by dividing a D10 value representing a thickness of one of the dielectric ceramic layers by a D90 value representing a size of the crystal grains,
B is a value obtained by integrating a molar ratio (%) of the rare-earth element to titanium in the crystal grains in a range of 0 to 24 nm in a direction from the crystal grain boundary into the crystal grains, and when a direct-current voltage is applied at 85° C. to the laminated ceramic capacitor, a voltage (V)/current (I) curve with Log V on a horizontal axis and Log I on a vertical axis has a critical point dividing the curve into a first area and a second area, the first area having a lower voltage than the second area, a critical electric field obtained by dividing a critical voltage at the critical point by a thickness of one of the dielectric ceramic layers is 10 V/μm or more, and a value obtained by subtracting a first slope of the voltage (V)/current (I) curve in the first area from a second slope of the voltage (V)/current (I) curve in the second area is 1 or less.

9. The laminated ceramic capacitor according to claim 8, wherein the dielectric ceramic layers have a composition including a barium titanate compound.

10. The laminated ceramic capacitor according to claim 8, wherein C is 60 or more.

11. The laminated ceramic capacitor according to claim 8, wherein the D10 value is obtained by measuring the thickness of the one of the dielectric ceramic layers at approximately 200 points.

12. The laminated ceramic capacitor according to claim 11, wherein the D90 value is obtained by measuring 500 to 1000 of the crystal grains at a fractured surface.

13. The laminated ceramic capacitor according to claim 8, wherein the D90 value is obtained by measuring 500 to 1000 of the crystal grains at a fractured surface.

14. The laminated ceramic capacitor according to claim 8, wherein the molar ratio of the rare-earth element to the titanium in the crystal grain is carried out at 0, 4, 8, 12 and 24 nm in the direction from the grain boundary into the grain.

15. A laminated ceramic capacitor comprising:

a laminated body comprising dielectric ceramic layers and internal electrode layers, the dielectric ceramic layers including crystal grains and crystal grain boundaries and having a composition including a barium titanate compound and containing a rare-earth element, wherein an average thickness of each of the dielectric ceramic layers is 0.7 to 2.0 μm;

external electrodes on respective surfaces of the laminated body an electrically connecting the internal electrode layers exposed at the respective surfaces of the laminated body; and

C=A×B, wherein C is 30 or more,

A is a value obtained by dividing a D10 value representing a thickness of one of the dielectric ceramic layers by a D90 value representing a size of the crystal grains, and B is a value obtained by integrating a molar ratio (%) of the rare-earth element to titanium in the crystal grains in a range of 0 to 24 nm in a direction from the crystal grain boundary into the crystal grains.

16. The laminated ceramic capacitor according to claim 15, wherein the C is 60 or more.

17. The laminated ceramic capacitor according to claim 15, wherein the D10 value is obtained by measuring the thickness of the one of the dielectric ceramic layers at approximately 200 points.

18. The laminated ceramic capacitor according to claim 15, wherein the D90 value is obtained by measuring 500 to 1000 of the crystal grains at a fractured surface.

* * * * *